(12) United States Patent
Shatzkamer et al.

(10) Patent No.: US 8,315,246 B2
(45) Date of Patent: Nov. 20, 2012

(54) SYSTEM AND METHOD EMPLOYING STRATEGIC COMMUNICATIONS BETWEEN A NETWORK CONTROLLER AND A SECURITY GATEWAY

(75) Inventors: Kevin Shatzkamer, New York, NY (US); Anand K. Oswal, Sunnyvale, CA (US); Navan Narang, Fremont, CA (US); Jayaraman Iyer, Sunnyvale, CA (US); Richard Kyle Forster, San Francisco, CA (US)

(73) Assignee: Cisco Technology, Inc., San Jose, CA (US)

(*) Notice: Subject to any disclaimer, the term of this patent is extended or adjusted under 35 U.S.C. 154(b) by 1453 days.

(21) Appl. No.: 11/437,058

(22) Filed: May 18, 2006

(65) Prior Publication Data

US 2007/0268888 A1  Nov. 22, 2007

(51) Int. Cl.
*H04L 12/66* (2006.01)
(52) U.S. Cl. ........ 370/352; 370/328; 370/338; 455/436; 455/411; 455/414.2
(58) Field of Classification Search .................. 370/352
See application file for complete search history.

(56) References Cited

U.S. PATENT DOCUMENTS

| | | | |
|---|---|---|---|
| 2003/0035409 A1* | 2/2003 | Wang et al. | 370/349 |
| 2005/0181805 A1* | 8/2005 | Gallagher | 455/456.1 |
| 2005/0266853 A1* | 12/2005 | Gallagher et al. | 455/439 |
| 2006/0174023 A1* | 8/2006 | Horn et al. | 709/231 |
| 2007/0041360 A1* | 2/2007 | Gallagher et al. | 370/352 |
| 2007/0238448 A1* | 10/2007 | Gallagher et al. | 455/414.2 |

OTHER PUBLICATIONS

"UMA Architecture (Stage 2), Unlicensed Mobile Access (UMA); Architecture (Stage 2)", Aquired at: http://kom.aau.dk/~ff/UMA/Stage2.pdf, 1 page, 2004 Alcatel, AT&T Wireless Services.
"UMA Technology", Aquired at: http://www.umatechnology.org/technology/index.htm, 2 pages, 2004-2005.

* cited by examiner

*Primary Examiner* — Asad Nawaz
*Assistant Examiner* — Jason Harley
(74) *Attorney, Agent, or Firm* — Patent Capital Group

(57) ABSTRACT

A system for enhancing functionality of a network. In a specific embodiment, the system employs strategic communications between a network controller and a security gateway. The strategic communications occur via a feedback communications channel between the network controller and the security gateway. The feedback communications channel facilitates transferring security information, such as International Mobile Subscriber Identity (IMSI) and other information, between the network controller and the security gateway. The security information may facilitate enabling the SGW to make intelligent decisions as to how to treat a client communications session. In the specific embodiment, the feedback communications channel includes an intervening Authentication, Authorization, and Accounting (AAA) server that is coupled between the UMA and the network controller.

35 Claims, 6 Drawing Sheets

SYSTEM AND METHOD EMPLOYING STRATEGIC COMMUNICATIONS BETWEEN A NETWORK CONTROLLER AND A SECURITY GATEWAY

BACKGROUND OF THE INVENTION

This invention is related in general to networks and more specifically relates to systems and methods for enhancing qualities, such as security, versatility, and scalability, of networks employing controllers and gateways.

Network controllers and accompanying gateways are employed in various demanding applications, including Unlicensed Mobile Access (UMA) networks and related Generic Access Networks (GANs), which employ the unlicensed spectrum to facilitate delivering Internet Protocol (IP) services to clients, such as multimode phones, that are connected to the UMA network or GAN. Exemplary services include broadband IP services involving file-transfer, Voice Over Internet Protocol (VoIP), or Global System for Mobile Communications (GSM) functionality, which are usable by the client. Examples of clients, also called Mobile Stations (MSs), include wireless phones, laptops with IEEE 802.11 wireless cards, and so on. For the purposes of the present discussion, the terms UMA network and GAN are employed interchangeably.

An exemplary UMA network includes wireless clients in communication with a UMA Controller (UNC), also called a GAN Controller (GANC), via an Access Point (AP), an IP access network, and a Security GateWay (SGW). The UNC facilitates maintaining a communication session between the wireless clients and a core mobile network, which may offer various services to the wireless clients. In certain UMA architectures, the SGW is integrated with the UNC. However, UNCs and SGWs are often developed by different companies. Accordingly, UMA architectures increasingly separate UNCs and SGWs. Unfortunately, UMA architectures employing separated UNCs and the SGWs often lack certain desirable capabilities and features.

DETAILED DESCRIPTION OF EMBODIMENTS OF THE INVENTION

A preferred embodiment of the present invention implements a feedback channel between a Security GateWay (SGW) and a controller, such as an Unlicensed Mobile Access (UMA) Network Controller (UNC) or a Generic Access Network (GAN) Controller (GANC) in a UMA network or a GAN. The feedback channel facilitates strategically communicating security information between the UNC and the SGW.

For the purposes of the present discussion, security information may be any information pertaining to a network entity that may be employed to verify, determine, or establish one or more qualities or characteristics associated with the network entity. Examples of security information include International Mobile Subscriber Identity (IMSI), subscriber location information, subscriber capabilities, Quality Of Service (QOS) profiles associated with client communications, and other network information, such as information that may enable an SGW to make intelligent decisions on how to treat a given user session.

The feedback channel may be employed to inhibit mobile station spoofing; to allow independent clustering of SGWs and UNCs, thereby facilitating correct network scaling; to enable a UNC to selectively terminate or delete an Internet SECurity (IPSEC) tunnel between a mobile station and an SGW as needed, and so on, to enhance network functionality and provide value-added services as desired.

For clarity, various well-known components, such as power supplies, modems, Serving GPRS (Generic Packet Radio Services) Support Nodes (SGSNs), firewalls, network cards, Internet Service Providers (ISPs), Internet Protocol SECurity (IPSEC) concentrators, Media GateWays (MGWs), Mobile Switching Centers (MSCs), load balancers, and so on, have been omitted from the figures. However, those skilled in the art with access to the present teachings will know which components to implement and how to implement them to meet the needs of a given application.

Figure 1:
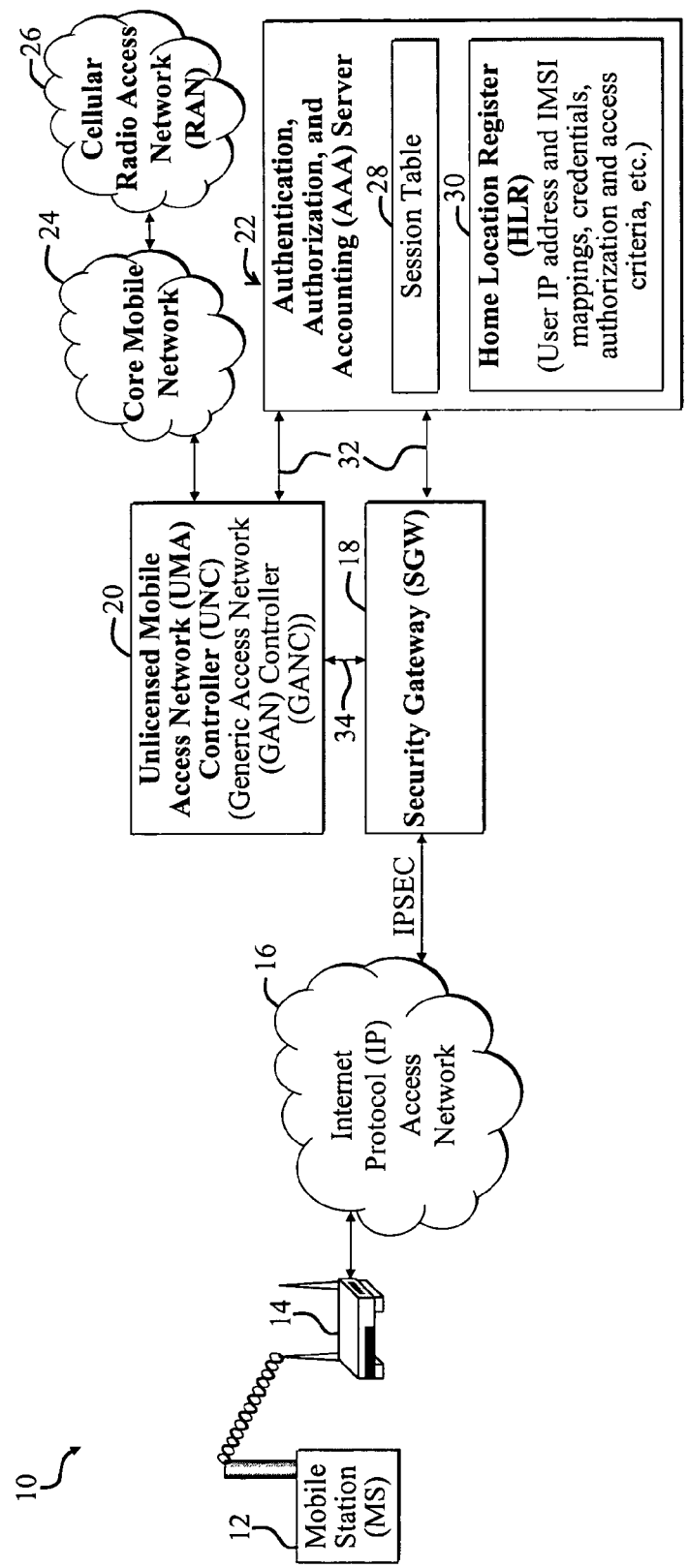
FIG. 1 is a diagram illustrating a UMA network employing a feedback channel between a Service GateWay (SGW) and a UNC according to a first embodiment of the present invention.

FIG. 1 is a diagram illustrating a UMA network 10 employing a feedback channel 32 between an SGW 18 and a UNC 20 according to a first embodiment of the present invention. The UMA network 10, which may also be considered a GAN network, includes a mobile station 12, such as a wireless multi-mode phone with 802.11 networking capabilities, that is coupled to an Internet Protocol (IP) access network 16.

A mobile station may be any device that can communicate wirelessly with a network. Examples of mobile stations include wireless phones, laptops with IEEE 802.11 wireless cards, other wireless clients, and so on.

The UMA network 10 further includes the SGW 18, which communicates with the IP access network 16, the UNC 20, and an Authentication, Authorization, and Accounting (AAA) server 22. The AAA server 22 is coupled between the SGW 18 and the UNC 20 and is positioned in the feedback channel 32 between the UNC 20 and the SGW 18. For the purposes of the present discussion, a communications channel, such as a feedback channel, may be any path or portion of a path over which or via which communications or signaling may occur.

In the present embodiment, the AAA server 22 may represent a path through which the feedback channel 32 passes. Accordingly, the AAA server 22 may be considered as including or accommodating the feedback channel 32 without departing from the scope of the present invention. Similarly, the feedback channel 32 may be considered as including or accommodating the AAA server 22. The AAA server 22 may include a portion of the feedback channel 32 or may include the entire feedback channel 32. Similarly, a portion of the feedback channel 32 may include the AAA server 22. For example, if connecting wires between the AAA server 22 and the LNC 20 and SGW 18 are replaced with direct contacts, the AAA server 22 may then be considered as approximately including the entire feedback channel 32. Alternatively, if the AAA server 22 is connected to the UNC 20 and the SGW 18 via an intervening network, then the AAA server 22 may be considered as including or accommodating one portion of the feedback channel 32, where the intervening network accommodates another portion of the feedback channel 32. The lengths of wires or other connectors between the AAA server 22 and the modules 18, 20 to which the AAA server 22 connects are application specific and may be adjusted to meet the needs of a given application. Furthermore, various additional modules may be included in the feedback channel 32, or the AAA server 22 may be removed from the feedback channel 32 or replaced with another module without departing from the scope of the present invention.

The AAA server 22 may be considered as part of a GPRS network that is coupled to the SGW 18 and the UNC 20. The SGW 18 further exchanges data traffic and related services information with the UNC 20 via a first communications channel 34 that connects the UNC 20 and the SGW 18.

The UNC 20 further communicates with a mobile core network 24, which is coupled to a cellular Radio Access Network (RAN) 26. The core network 24 may facilitate providing various Global System for Mobile Communications (GSM) services to the mobile station 12. For example, the core mobile network 24 may facilitate handing over the mobile station 12 to the cellular RAN 26 when the mobile station 12 moves from the coverage area of the AP 14 to a coverage area of the cellular RAN 26. For illustrative purposes, the AAA server 22 is shown including a session table 28 for maintaining information pertaining to a given communication session associated with the mobile station 12. The AAA server 22 further includes a database 30 for maintaining IP address information, International Mobile Subscriber Identity (IMSI) information, and other credentials and information employed to establish authorization and access criteria. For example, the information may include mappings or associations that associate or map a given mobile station IMSI to a given set of allowed functions and/or authorized services. The database 30, which may be implemented via a Home Location Register (HLR), may be implemented as a separate module from the AAA server 22 without departing from the scope of the present invention.

For the purposes of the present discussion, an association may be any data or information that pertains to a relationship between two or more network entities. An example of an association includes information, such as in a database or an AAA start record, that relates an IP address, an IMSI, and a mobile station with an AAA start record.

In the present specific embodiment, the SGW 18 is implemented as a separate module from the UNC 20, such that the SGW 18 and the UNC 20 are not integrated as a single software and/or hardware program.

In operation, the mobile station 12, the AP 14, and the SGW 18 intercommunicate to establish an IPSEC tunnel through the IP access network 16 between the mobile station 12 and the SGW 18. The SGW 18 communicates with the AAA server 12 to facilitate authenticating the mobile station 12. Authenticating may involve determining which network features and/or services the mobile station 12 is authorized to use and/or capable of using. The IMSI of the mobile station 12 may be compared to predetermined IMSI criteria maintained by the AAA server 22 to determine whether or not to authorize the mobile station 12 for certain communications via the network 10.

After the mobile station 12 is authenticated by the SGW 18, the first communications channel 34 is established between the SGW 18 and the UNC 20, enabling the mobile station 12 to connect to the core mobile network 24 and/or accompanying cellular RAN 26 (which may be a GSM network) through the UNC 20 via a user communication session maintained by the UNC 20. The mobile station 12 may access various network services via the first communications channel 34 over which signaling, i.e., communications pertaining to the services, such as file transfers, is transmitted and/or received between the core mobile network 24 and the mobile station 16.

Conventionally, communications between the SGW 18 and the UNC 20, especially in implementations wherein the SGW 18 and the UNC 20 are implemented as separate physical modules, are relatively limited. For example, in existing networks, the SGW 18 could authenticate the mobile station 12 based on a first set of credentials or other security information, but mobile station identification information that is subsequently sent by the mobile station 12 to the UNC 20 via the first communications channel 34 could be different. This represented a security problem that could enable malicious network users to possibly steal network services.

The present embodiment overcomes this limitation among others, by strategically communicating security information between the UNC 20 and the SGW 18, such as via the AAA server 22, as discussed more fully below. Another feedback channel in addition to or other than the feedback channel involving the AAA server 22 may be employed without departing from the scope of the present invention. For example, in certain implementations, the AAA server 22 may be implemented in the SGW 18 or otherwise omitted from the feedback channel 32.

IMSI spoofing is said to occur when the mobile station 12 employs one IMSI to initially authenticate via the SGW 18 and AAA server 22 and another IMSI (or no IMSI) to subsequently communicate with the core mobile network 24 via the UNC 20 and associated first communications channel 34. To prevent IMSI spoofing by the mobile station 12, the UNC 20 includes one or more routines for learning, from the AAA server 22, the original authenticated mappings or associations of the IP address and the IMSI of the mobile station 12. Upon receiving the IMSI and the IP address mapping of the mobile station 12, the UNC 20 stores this information and then periodically compares the stored mobile-station identification information (e.g. IMSI) with the mobile-station identification information sent by the mobile station 12 in all signaling messages, such as messages occurring via the first communications channel 34. This prevents or inhibits spoofing by malicious users, since the UNC 20 may subsequently drop the communications associated with the mobile station that is spoofing. A mismatch between the stored mobile-station identification information and the subsequently used mobile-station identification may result in dropping the associated communications or triggering an alarm.

The feedback channel 32 may also be employed to selectively delete the IPSEC tunnel between the mobile station 12 and the SGW 18. For example, in certain operating scenarios, it is strategic for the UNC to signal the SGW 18 to delete a tunnel for the mobile station 12. Similarly, it may be strategic for the SGW 18 to delete a communications session maintained by the UNC 20. A delete-tunnel attribute, which may include a Remote Authentication Dial In User Service (RADIUS) Certificate Of Authentication (COA), may be sent by the AAA server 22 to the SGW 18 via the UNC 20 in response to a request for tunnel deletion from the UNC 20. Similarly, the SGW 18 may send a request to delete a communications session (as opposed to a tunnel) to the AAA server 22, which then forwards an accompanying session-delete attribute to the UNC 22. The session-delete attribute is sufficient to instruct and cause the UNC 20 to delete the communications session indicated in the session-delete attributed.

In the present operative scenarios, tunnel-delete attributes and session-delete attributes are relayed between the UNC 20 and the SGW 18 via the AAA server 22. The AAA server 22 maintains the session table 28 and has access to the database 30. The session table 28 and/or the database 30 are used by the AAA server 22 to define the tunnel-delete and session-delete attributes in response to requests from the UNC 20 and the SGW 18, respectively. The session table 28 may track which SGW 18 is communicating with which UNC 20, which is helpful in implementations involving plural SGWs and plural UNCs as discussed more fully below.

Those skilled in the art with access to the present teachings may readily implement requisite routines in the UNC 20, the SGW 18, and the AAA server 22 to facilitate implementing the feedback channel 32 and to further utilize the feedback channel 32 to enhance the security and functionality of the accompanying network 10 in accordance with embodiments of the present invention.

Figure 2:
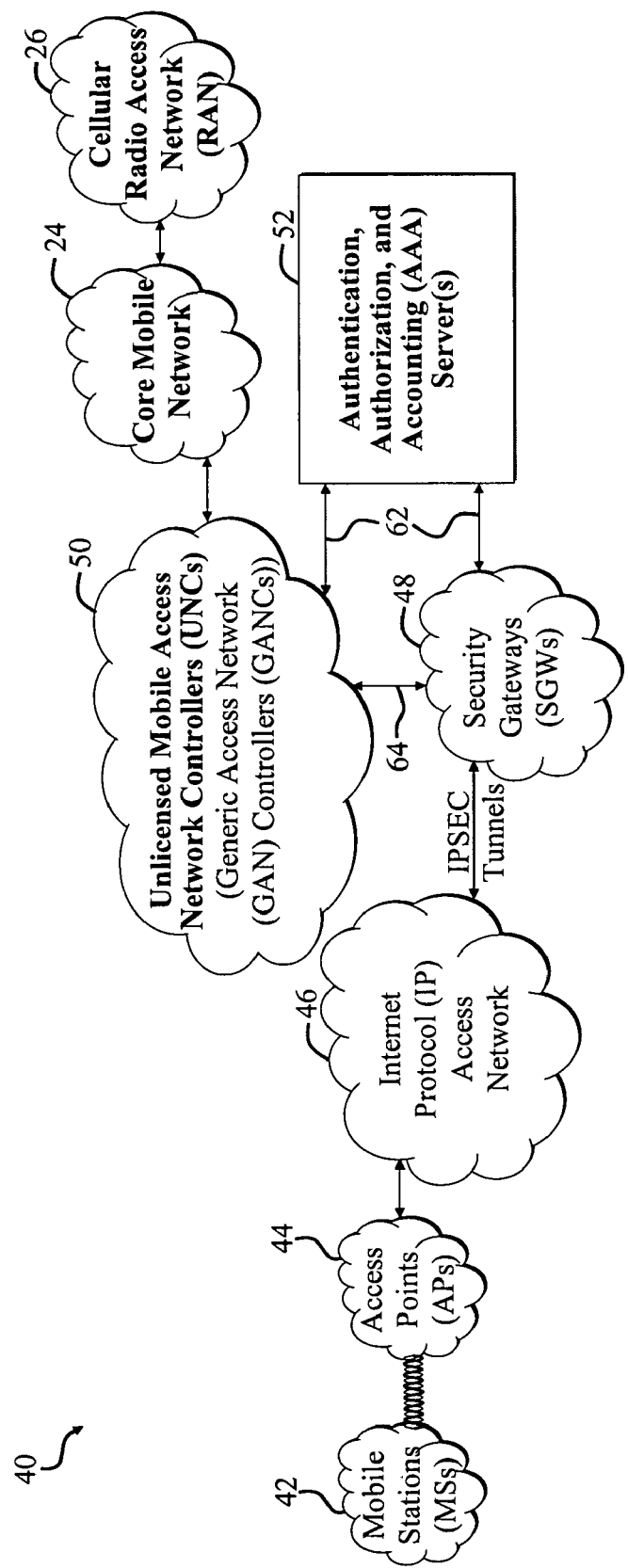
FIG. 2 is a diagram illustrating a second UMA network employing feedback channels between multiple UNCs and multiple independent SGWs according to a second embodiment of the present invention.

FIG. 2 is a diagram illustrating a second UMA network 40 employing feedback channels 62 between multiple UNCs 50 and multiple independent SGWs 48 according to a second embodiment of the present invention. The second UMA network 40 includes multiple mobile stations 42 communicating with multiple APs 44, which communicate with the SGWs 48 via an intervening second IP access network 46. The SGWs 48 communicate with the UNCs 50 via first communications channels 64 between the SGWs 48 and the UNCs 50. One or more AAA servers 52 are coupled between the UNCs 50 and the SGWs 48 and form part of the feedback channels 62 between the SGWs 48 and the UNCs 50.

In operation, use of the feedback channels 62 enable strategic assignment between a given SGW and a given UNC so that a specific UNC of the UNCs 20 is not required to be limited to communicating with a specific SGW of the SGWs 48. For example, in certain operating conditions, it may be desirable for an overloaded UNC to offload communications with certain SGWs to other UNCs. The feedback channels 62 may be employed to selectively adjust communications relationships, such as relationships that determine which of the UNCs 20 communicate with which of the SGWs 18. Exact details pertaining to how communications signaling is balanced between the UNCs 20 and the SGWs 18 are application specific. Those skilled in the art with access to the present teachings may readily implement appropriate routines to control communications relationships between the UNCs 20 and the SGWs 48 in to meet the needs of a given implementation.

The feedback channels 62 may be employed to facilitate establishing consistent connections associated with mobile-station communication sessions between an SGW of the SGWs 48 and a UNC of the UNCs 50. For example, conventionally UMA network implementations with plural UNCs and plural SGWs lack efficient mechanisms to track session resource limits for a particular mobile-station communications session. For example, a given SGW may accept an IPSEC connection pertaining to one of the mobile stations 42, but a selected UNC or GANC may not have sufficient resources to handle the specific mobile-station communications session. In this case, the selected UNC may run one or more routines that are sufficient to send a so-called Packet of Disconnect (PoD), such as by using RADIUS COA, to the appropriate AAA server 52. The AAA server 52 may then communicate with the appropriate SGW to cause the SGW to terminate the associated IPSEC connection, or to redirect the IPSEC connection to another UNC, thereby relieving congestion at the UNC.

Hence, the network 10 may be considered as implementing a system for enhancing the functionality of a network, wherein the system includes a first mechanism 34 for establishing first communications between a mobile station 12 connected to the network 10 and a UNC 20 via an SGW 18. A second mechanism 32, 22 strategically exchanges security information via second communications between the UNC 20 and the SGW 34 to manage the first communications. The first communications may correspond to a first signal that is transmitted and/or received between mobile station 12 and the UNC 20 via the SGW 18 and communications channel 34. The second communications may correspond to a second signal that is transmitted and/or received between the SGW 18 and the UNC 20 via the feedback channel 32 through the AAA server 22.

For the purposes of the present discussion, to exchange information may mean to transmit and/or receive the information. Furthermore, the term establishing communications, such as the first communications and/or the second communications, may mean to initiate any form of information or data transmission and/or reception. The term communications, such as first communications may mean any transmission and/or reception of information between two or more entities, such as the SGW 18 and the UNC 20. Accordingly, communications between two entities may occur over one or more channels. Furthermore, multiple types of communications may occur over a single channel. For example, the first communications may occur over a given channel during one time slot, while the second communications may occur over the same channel during another time slot.

While the present embodiment is discussed with respect to the plural communications channels 32, 34 occurring between the SGW 18 and the UNC 20, the communications channels 32, 34 may be integrated into a single medium or link without departing from the scope of the present invention. Furthermore, the AAA server 22 may be omitted from the feedback channel 32 or otherwise replaced with another device or integrated in the SGW 18 or the UNC 20 without departing from the scope of the present invention.

Figure 3:
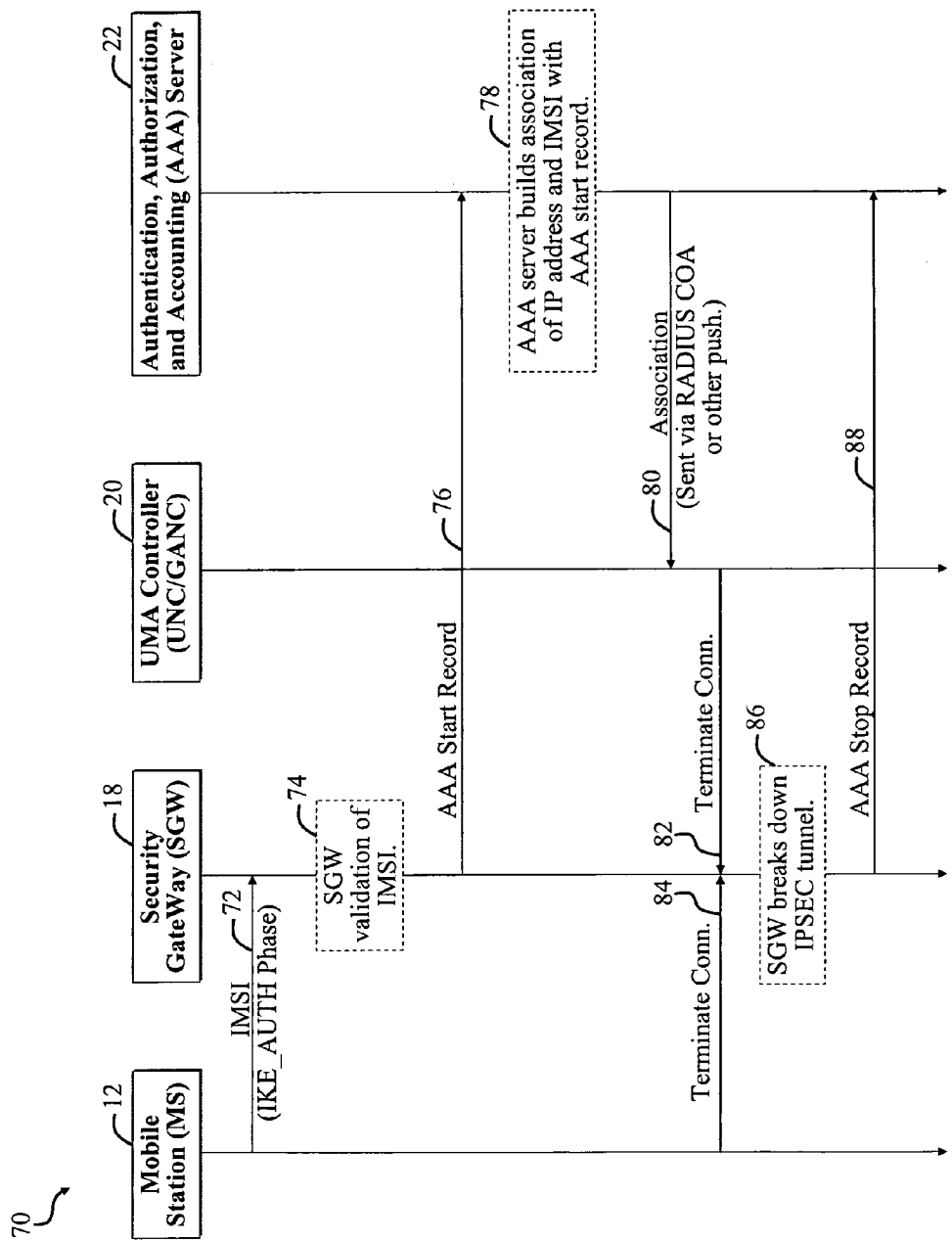
FIG. 3 is a Ping-Pong diagram illustrating an exemplary sequence of communications occurring between components of the networks of FIGS. 1 and 2.

FIG. 3 is a Ping-Pong diagram illustrating an exemplary sequence 70 of messages and operations occurring between components 12, 18, 20, 22 of the networks 10, 40 of FIGS. 1 and 2. With reference to FIGS. 1 and 3, the sequence 70 includes an initial IMSI message 72 sent from the mobile station 12 to the SGW 18. The SGW 18 then validates the IMSI in a validation step 74 before sending an AAA start record 76 to the AAA server 22.

In a subsequent associating step 78, the AAA server 22 builds an association pertaining to the AAA start record via IP address information and IMSI information associated with the mobile station 12 before sending an association message 80 to the UNC 20. The association message 80 may be sent via a RADIUS COA or other push mechanism.

Subsequently, upon receiving an connection-termination message 82 from the AAA server 22 or a connection-termination message from the mobile station 12, the SGW 18 breaks down or cancels the associated IPSEC connection in a tunnel break-down step 86. Subsequently, the SGW 18 sends a corresponding AAA stop record 88 to the AAA server 22.

Figure 4:
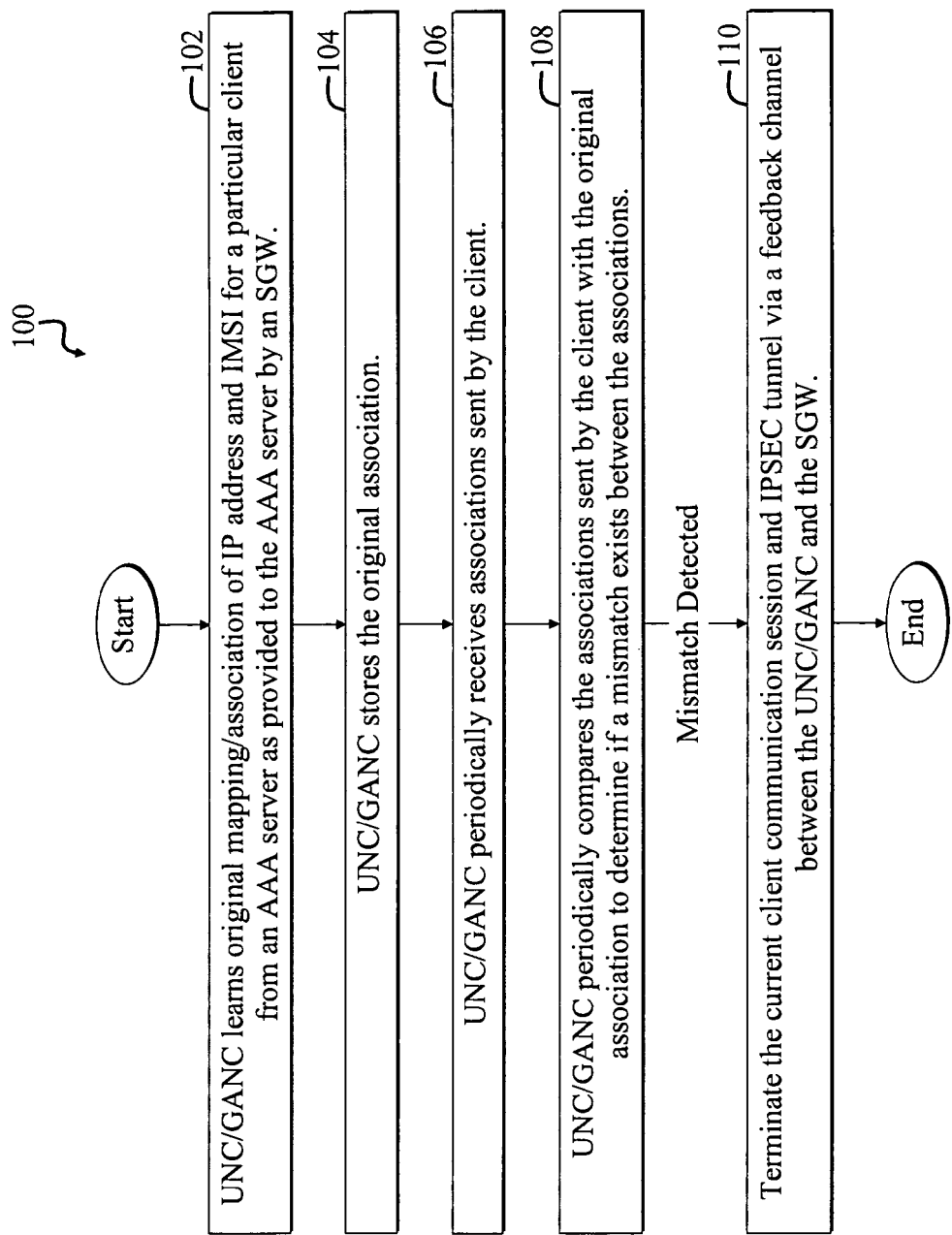
FIG. 4 is a flow diagram of a first method adapted for use with the networks of FIGS. 1 and 2.

FIG. 4 is a flow diagram of a first method 100 adapted for use with the networks 10, 40 of FIGS. 1 and 2. The method 100 includes an initial learning step 102, wherein a UNC learns a mapping, which maps an IP address and an IMSI to a mobile station, from an AAA server. The AAA server previously received appropriate mobile-station identification, such as IMSI information, from an SGW.

In a subsequent association-storing step 104, the UNC stores the association, which may be an association mapping or associating a mobile station and with a given IMSI.

Next, an IMSI-receiving step 106 involves the UNC receiving IMSI information or other identification information, such as via the first communication channel 34 of FIG. 1.

In a subsequent IMSI-comparing step 108, the UNC periodically compares the received IMSI information with the previously stored association. If a mismatch is detected between the received IMSI information and the previously stored association, then a terminating step 110 is performed.

The terminating step 110 involves terminating the communication session and associated IPSEC tunnel via a feedback channel between the UNC and the SGW, which includes an intervening AAA server. The method 100 subsequently completes or repeats as necessary for a given implementation.

Figure 5:
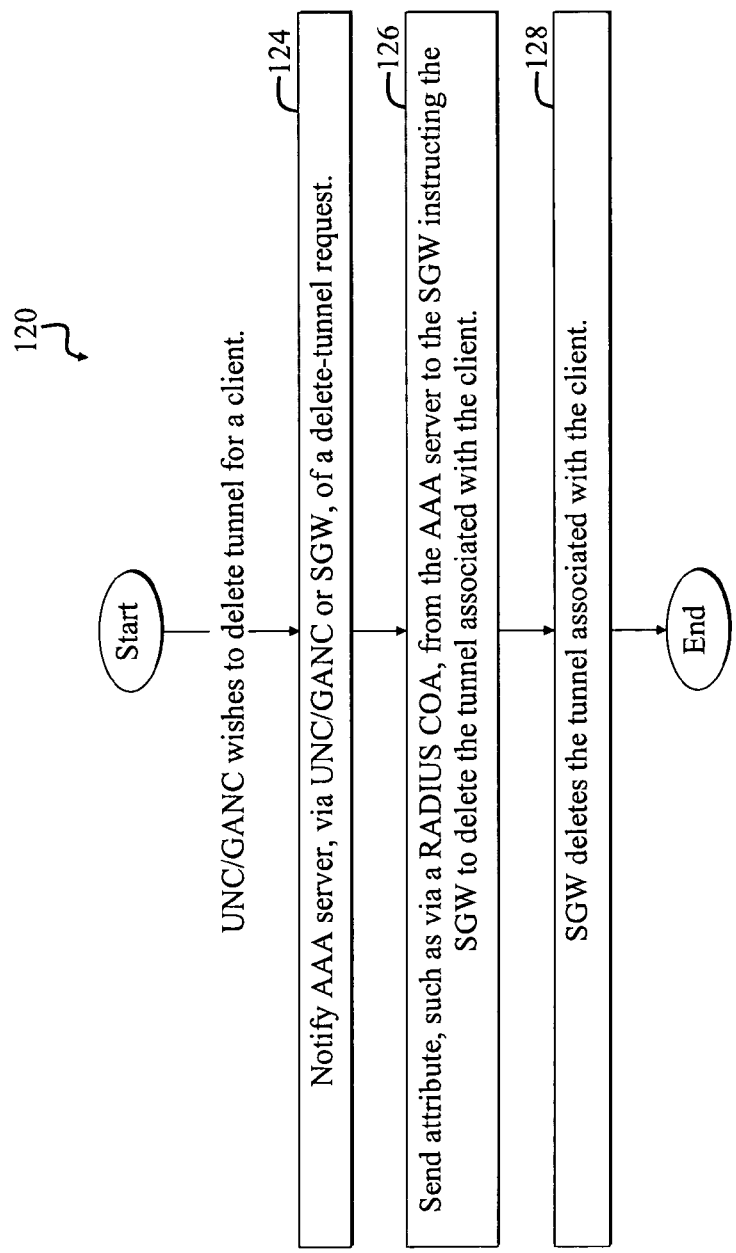
FIG. 5 is a flow diagram of a second method adapted for use with the networks of FIGS. 1 and 2.

FIG. 5 is a flow diagram of a second method 120 adapted for use with the networks 10, 40 of FIGS. 1 and 2. The second method 120 begins when a UNC or GANC determines that an IPSEC tunnel pertaining to a given mobile station should be deleted or terminated. In the present specific embodiment, the initial notification step 124 involves a UNC sending request to delete an IPSEC connection to an AAA server.

Subsequently, an attribute-sending step 126 involves the AAA server sending an IPSEC-termination attribute or other message from the AAA server to an SGW that is currently accommodating the IPSEC connection that should be deleted or canceled.

Next, in a tunnel-deletion step 128, the SGW deletes or otherwise ends the IPSEC tunnel connection in response to receipt of the IPSEC-termination attribute from the AAA server.

Figure 6:
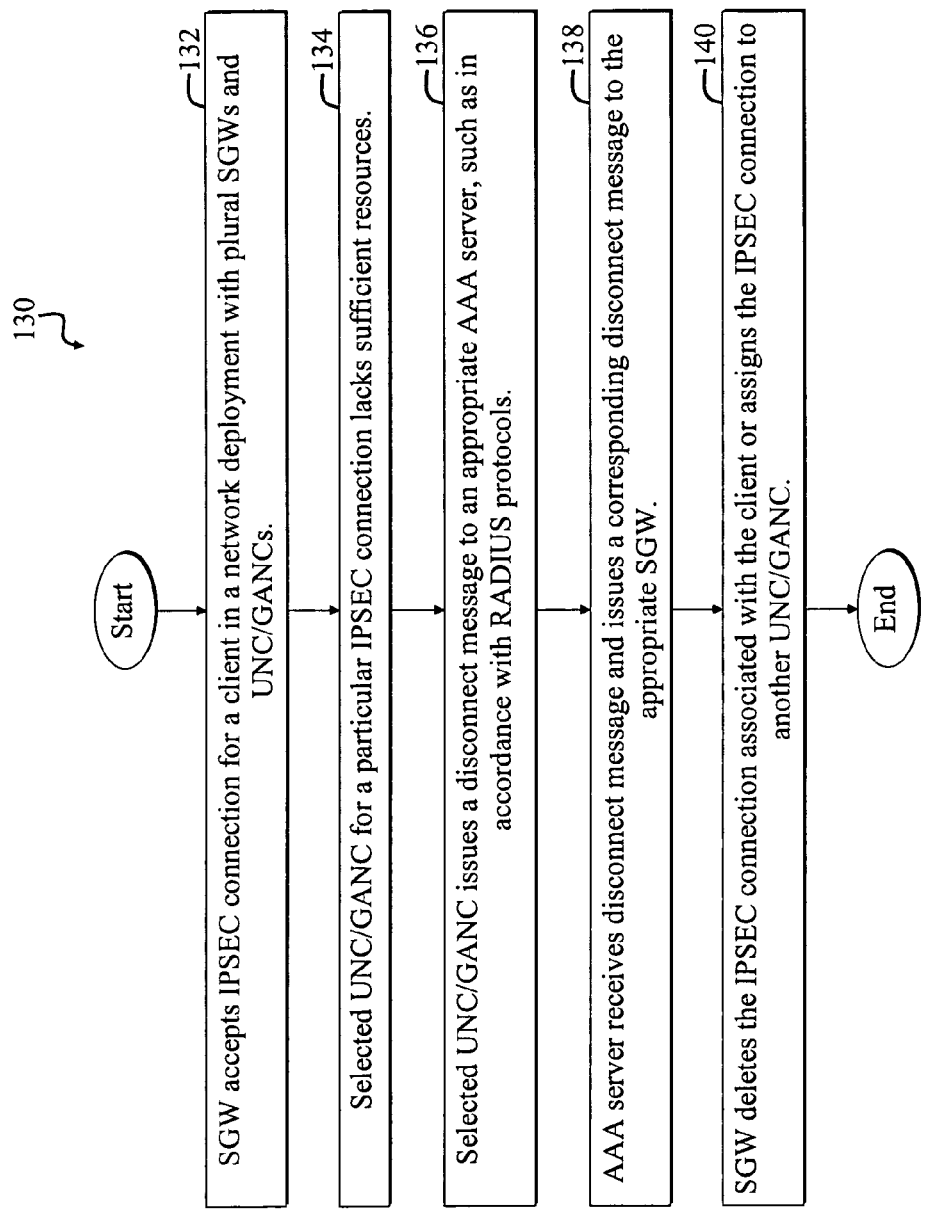
FIG. 6 is a flow diagram of a third method adapted for use with the networks of FIGS. 1 and 2.

FIG. 6 is a flow diagram of a third method 130 that is adapted for use with the networks 10, 40 of FIGS. 1 and 2. The third method 130 includes an initial IPSEC-tunnel-establishing step 132, wherein an SGW accepts and IPSEC connection for a mobile station in a UMA network with multiple SGWs and UNCs.

Subsequently, a UNC-resource-determining step 132 determines that a UNC handling the IPSEC connection lacks sufficient resources to maintain the IPSEC connection while providing a desired QOS.

Subsequently, in a disconnect-messaging step 134, the UNC issues a disconnect request, such as via a RADIUS COA, to an AAA server.

Next, in a forwarding step 138, the AAA server sends a corresponding disconnect message to the SGW handling the IPSEC connection to be disconnected.

In a subsequent disconnecting step 140, the SGW disconnects the IPSEC connection in response to receipt of the disconnect message from the AAA server.

Although embodiments of the invention are discussed primarily with respect to networks employing wireless unlicensed spectrum, embodiments of the present invention may be adapted to any network modules that ordinarily exhibit one type of communication link but would benefit by employing strategic signaling in accordance with embodiments disclosed therein. Furthermore, any acceptable architecture, topology, protocols, or other network and digital processing features can be employed. In general, network modules, such as access points, endpoints, and so on, can be implemented via any device with processing ability or other requisite functionality.

Although processes of the present invention and the hardware executing the processes may be characterized by language common to a discussion of the Internet and UMA or GAN networks (e.g., "client," "UNC," "GANC," etc.), it should be apparent that operations of the present invention can execute on any type of suitable hardware in any communication relationship to another device on any type of link or network.

Although a process of the present invention may be presented as a single entity, such as software executing on a single machine, such software can readily be executed on multiple machines. That is, there may be multiple instances of a given software program, a single program may be executing on two or more processors in a distributed processing environment, parts of a single program may be executing on different physical machines, etc. Furthermore, two different programs, such as a client and server program, can be executing in a single machine, or in different machines. A single program can be operations a client for one information transaction and as a server for a different information transaction.

Any type of processing device can be used as a client. For example, portable computing devices such as a personal digital assistant (PDA), cell phone, laptop computer, or other devices can be employed. In general, the devices and manner of specific processing (including location and timing) are not critical to practicing important features of the present invention.

Although the invention has been discussed with respect to specific embodiments thereof, these embodiments are merely illustrative, and not restrictive, of the invention. Embodiments of the present invention can operate between any two processes or entities including users, devices, functional systems, or combinations of hardware and software. Peer-to-peer networks and any other networks or systems where the roles of client and server are switched, change dynamically, or are not even present are within the scope of the invention.

Any suitable programming language can be used to implement the routines or other instructions employed by various network entities. Exemplary programming languages include C, C++, Java, assembly language, etc. Different programming techniques can be employed such as procedural or object oriented. The routines can execute on a single processing device or multiple processors. The routines can operate in an operating system environment or as stand-alone routines occupying all, or a substantial part, of the system processing.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "machine-readable medium" or "computer-readable medium" for purposes of embodiments of the present invention may be any medium that can contain and store the program for use by or in connection with the instruction execution system, apparatus, system or device. The computer readable medium can be, by way of example only but not by limitation, a semiconductor system, apparatus, system, device, or computer memory.

A "processor" or "process" includes any hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented in whole or in part by using a programmed general purpose digital computer; by using application specific integrated circuits, programmable logic devices, field programmable gate arrays, optical, chemical, biological, quantum or nanoengineered systems or mechanisms; and so on. In general, the functions of the present invention can be achieved by any means as is known in the art. Distributed or networked systems, components, and/or circuits can be used. Communication, or transfer of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow "a", "an", and "the" include plural references unless the context clearly dictates otherwise. Furthermore, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A system for enhancing functionality of a network, the system comprising:
   a network controller communicating with a mobile station seeking access to the network, the network comprising an Unlicensed Mobile Access (UMA) network, and the network controller being a UMA Controller (UNC);
   a security gateway in communication with the network controller via a first communications channel, the first communications channel being established after authentication of the mobile station for access to the network, wherein the network controller and the security gateway are separate physical modules; and
   a second communications channel to enable transfer of security information between the network controller and the security gateway, wherein the second communications channel involves an Authentication, Authorization, and Accounting (AAA) server, and wherein a first operation learns a mapping between an Internet protocol (IP) address and a first identifier associated with the mobile station, and wherein the mapping is stored for a subsequent comparison such that if a mismatch is detected between the mapping that is stored and a second identifier associated with the mobile station received a second operation is executed in which a disconnect packet is sent from the UNC to the AAA server, and wherein the security gateway is configured to validate an International Mobile Subscriber Identity (IMSI) of the mobile station and to forward an AAA start record to the AAA server for building an association relating the IP address of the mobile station and the IMSI of the mobile station with the AAA start record and the resulting association is returned to the UNC.

2. The system of claim 1, wherein the security information includes: an International Mobile Subscriber Identity (IMSI) associated with the mobile station.

3. The system of claim 1, wherein the security information includes: an Internet Protocol (IP) address associated with mobile station.

4. A system for enhancing functionality of a network, the system comprising:
   a Security GateWay (SGW) transmitting, over a first communications channel, a first signal between a mobile station connected to the network and an Unlicensed Mobile Access (UMA) Controller (UNC); and
   the Security GateWay (SGW) transmitting security information via a second signal between the UNC and the SGW to manage the first signal, wherein the UNC and the SGW are separate physical modules, wherein the second signal is transmitted on a second communications channel that involves an Authentication, Authorization, and Accounting (AAA) server, and wherein a first operation is executed to learn a mapping between an Internet protocol (IP) address and a first identifier associated with the mobile station, and wherein the mapping is stored for a subsequent comparison such that if a mismatch is detected between the mapping that is stored and a second identifier associated with the mobile station a second operation is executed in which a disconnect packet is sent from the UNC to the AAA server, and wherein the security gateway is configured to validate an International Mobile Subscriber Identity (IMSI) of the mobile station and to forward an AAA start record to the AAA server for building an association relating the IP address of the mobile station and the IMSI of the mobile station with the AAA start record and the resulting association is returned to the UNC.

5. The system of claim 4, further including:

communicating identification information from the SGW to the UNC via the second communications channel.

6. The system of claim 5, wherein the identification information includes: an International Mobile Subscriber Identity (IMSI).

7. The system of claim 5, wherein the identification information includes: an Internet Protocol (IP) address associated with the mobile station.

8. The system of claim 5, further including: employing the identification information at the UNC to verify that communications corresponding to the first signal and occurring via the first communications channel, are authorized.

9. The system of claim 4, further including: communicating, via the second channel, a termination request from the UNC to the SGW to facilitate terminating a secure connection between the SGW and the mobile station.

10. The system of claim 9, wherein the secure connection includes: an IP SECurity (IPSEC) tunnel between the mobile station and the SGW.

11. A method for communicating between entities in a network, the method comprising: connecting a mobile station to an Unlicensed Mobile Access (UMA) Controller (UNC) via a Security GateWay (SGW), wherein the UNC and the SGW are separate physical modules;

transmitting security information between the SGW and the UNC on a feedback channel that involves an Authentication, Authorization, and Accounting (AAA) server, and wherein a first operation is executed to learn a mapping between an Internet protocol (IP) address and a first identifier associated with the mobile station, and wherein the mapping is stored for a subsequent comparison such that if a mismatch is detected between the mapping that is stored and a second identifier associated with the mobile station a second operation is executed in which a disconnect packet is sent from the UNC to the AAA server, and wherein the security gateway is configured to validate an International Mobile Subscriber Identity (IMSI) of the mobile station and to forward an AAA start record to the AAA server for building an association relating the IP address of the mobile station and the IMSI of the mobile station with the AAA start record and the resulting association is returned to the UNC.

12. The method of claim 11, wherein the connecting includes:

creating an Internet Protocol SECurity (IPSEC) tunnel between the mobile station and the SGW and subsequently passing communications associated with the IPSEC tunnel to the UNC.

13. The method of claim 12, wherein the transmitting includes: transmitting, via the feedback channel, the security information, including identification information pertaining to the mobile station.

14. The method of claim 13, wherein the security information further includes: a location of the mobile station.

15. The method of claim 13, wherein the security information further includes: information pertaining to capabilities of the mobile station.

16. A method for communicating information in a network with a mobile station, a security gateway, a network controller, and a server, the method comprising:

sending a first message, containing identification information, from the mobile station to the security gateway; validating the identification number via the security gateway; forwarding a record to an Authentication, Authorization, and Accounting (AAA) server via the security gateway; building an association relating the identification information with the record via the server; and forwarding the association to the network controller from the AAA server, wherein the security gateway and the network controller are coupled via a feedback channel that involves the AAA server, and wherein a first operation is executed to learn a mapping between an Internet protocol (IP) address and a first identifier associated with the mobile station, and wherein the mapping is stored for a subsequent comparison such that if a mismatch is detected between the mapping that is stored and a second identifier associated with the mobile station a second operation is executed in which a disconnect packet is sent from the UNC to the AAA server, and wherein the security gateway is configured to validate an International Mobile Subscriber Identity (IMSI) of the mobile station and to forward an AAA start record to the AAA server for building an association relating the IP address of the mobile station and the IMSI of the mobile station with the AAA start record and the resulting association is returned to the UNC.

17. The method of claim 16, wherein the network includes: a Generic Access Network (GAN) network.

18. The method of claim 17, wherein the network controller includes: a GAN Controller (GANC).

19. The method of claim 18, wherein the identification number includes: an International Mobile Subscriber Identity (IMSI).

20. A computer-readable non transitory storage medium including instructions executable by one or more processors for communicating between entities in a network, the computer-readable storage medium including one or more instructions for:

establishing a first channel between a mobile station connected to the network and an Unlicensed Mobile Access (UMA) Controller (UNC) via a Security GateWay (SGW); and transmitting security information via a second channel between the UNC and the SGW to manage communications occurring via the first channel, wherein the UNC and the SGW are separate physical modules, wherein the second channel involves an Authentication, Authorization, and Accounting (AAA) server, and wherein a first operation is executed to learn a mapping between an Internet protocol (IP) address and a first identifier associated with the mobile station, and wherein the mapping is stored for a subsequent comparison such that if a mismatch is detected between the mapping that is stored and a second identifier associated with the mobile station a second operation is executed in which a disconnect packet is sent from the UNC to the AAA server, and wherein the security gateway is configured to validate an International Mobile Subscriber Identity (IMSI) of the mobile station and to forward an AAA start record to the AAA server for building an association relating the IP address of the mobile station and the IMSI of the mobile station with the AAA start record and the resulting association is returned to the UNC.

21. An apparatus for enhancing functionality of a network, the apparatus comprising:
a controller adapted to receive a first signal from a security gateway that is a separate physical module from the controller, wherein the controller is further adapted to receive security information via a feedback channel between the controller and the security gateway, wherein the controller is further adapted to employ the security information to adjust the first signal, wherein feedback channel involves a server coupled between the security gateway and the controller, and wherein a first operation is executed to learn a mapping between an Internet protocol (IP) address and a first identifier associated with the mobile station, and wherein the mapping is stored for a subsequent comparison such that if a mismatch is detected between the mapping that is stored and a second identifier associated with the mobile station a second operation is executed in which a disconnect packet is sent, and wherein the security gateway is configured to validate an International Mobile Subscriber Identity (IMSI) of the mobile station and to forward an accounting start record to the server for building an association relating the IP address of the mobile station and the IMSI of the mobile station with the accounting start record and the resulting association is returned to the UNC.

22. The apparatus of claim 21, wherein the first signal includes data traffic.

23. The apparatus of claim 21, wherein the controller is configured to perform a routine for selectively terminating a communications session associated with the first signal when identification information transmitted by the mobile station to the controller via the first signal does not match corresponding identification information included in the security information.

24. The apparatus of claim 21, wherein the server includes: an Authentication, Authorization, and Accounting (AAA) server coupled between the security gateway and the controller.

25. The apparatus of claim 24, wherein the controller is configured to perform a routine for selectively retrieving authentication information from the AAA server, wherein the security information pertains to a client that is coupled to the network, and wherein the AAA server is adapted to retrieve the security information from the security gateway.

26. The apparatus of claim 25, wherein the first signal includes communications between the client and the controller, wherein the communications occur via the security gateway, wherein the security gateway is coupled between the client and the controller.

27. The apparatus of claim 25, wherein the security gateway is adapted to communicate with the client, the AAA server, and the controller.

28. The apparatus of claim 21, wherein the controller is configured to perform a routine for managing the first signal, wherein the routine is adapted to selectively receive the security information, via the feedback channel and a second signal, wherein the security information pertains to a network client.

29. The apparatus of claim 28, wherein the controller is further configured to perform a routine that is adapted to selectively terminate a tunnel formed between the security gateway and the network client when the security information does not meet a desired criterion.

30. An apparatus for enhancing functionality of a network, the apparatus comprising:
a security gateway adapted to communicate with a mobile station and a controller that is a separate physical module from the security gateway via a first communications channel, wherein the security gateway is further adapted to communicate with the controller via a second communications channel, wherein the security gateway is further adapted to employ the second communications channel to selectively control the first communications channel, wherein the second communications channel involves a server coupled between the security gateway and the controller, and wherein the controller is configured to execute a first operation that learns a mapping between an Internet protocol (IP) address and a first identifier associated with the mobile station, and wherein the mapping is stored for a subsequent comparison such that if a mismatch is detected between the mapping that is stored and a second identifier associated with the mobile station a second operation is executed in which a disconnect packet is sent from the controller and wherein the security gateway is configured to validate an International Mobile Subscriber Identity (IMSI) of the mobile station and to forward an accounting start record to the server for building an association relating the IP address of the mobile station and the IMSI of the mobile station with the accounting start record and the resulting association is returned.

31. The apparatus of claim 30, wherein the security gateway is configured to perform a routine for managing the first communications, wherein the routine is adapted to selectively terminate the first communications channel in response to a signal from the controller.

32. The apparatus of claim 31, wherein the signal from the controller includes: a request to delete a tunnel established between the security gateway and the mobile station.

33. An apparatus for enhancing functionality of a network, the apparatus comprising:
a server comprising a processor adapted to communicate with a controller and a security gateway, wherein the controller and the security gateway are separate physical modules, wherein the server is further adapted to selectively relay security information between the controller and the gateway using a feedback channel involving the server, and wherein the controller is configured to execute a first operation that learns a mapping between an Internet protocol (IP) address and a first identifier associated with the mobile station, and wherein the mapping is stored by for a subsequent comparison such that if a mismatch is detected between the mapping that is stored and a second identifier associated with the mobile station a second operation is executed in which a disconnect packet is sent from the controller, and wherein the security gateway is configured to validate an International Mobile Subscriber Identity (IMSI) of the mobile station and to forward an accounting start record to the server for building an association relating the IP address of the mobile station and the IMSI of the mobile station with the accounting start record and the resulting association is returned.

34. The apparatus of claim 33, wherein the server includes: an Authentication, Authorization, and Access (AAA) server.

35. The apparatus of claim 33, wherein the controller includes: an Unlicensed Mobile Access (UMA) Controller (UNC).

* * * * *